(12) United States Patent
Caronni (10) Patent No.: US 7,792,300 B1
(45) Date of Patent: *Sep. 7, 2010

(54) METHOD AND APPARATUS FOR RE-ENCRYPTING DATA IN A TRANSACTION-BASED SECURE STORAGE SYSTEM

(75) Inventor: Germano Caronni, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1911 days.

This patent is subject to a terminal disclaimer.

(21) Appl. No.: 10/675,667

(22) Filed: Sep. 30, 2003

(51) Int. Cl.
*H04L 9/00* (2006.01)

(52) U.S. Cl. ............... 380/277; 380/259; 380/260; 380/261; 380/262; 380/263; 380/264; 380/265; 380/266; 705/71; 713/171; 726/1; 726/2; 726/26

(58) Field of Classification Search .......... 380/277
See application file for complete search history.

(56) References Cited

U.S. PATENT DOCUMENTS

| | | | | |
|---|---|---|---|---|
| 5,696,829 A * | 12/1997 | Cordery et al. | ............... | 380/55 |
| 5,963,960 A * | 10/1999 | Swart et al. | ............... | 707/202 |
| 6,041,412 A * | 3/2000 | Timson et al. | ............... | 726/3 |
| 6,253,205 B1 * | 6/2001 | Quarato et al. | ........... | 707/103 R |
| 6,449,720 B1 * | 9/2002 | Sprague et al. | ............... | 713/171 |
| 6,490,680 B1 * | 12/2002 | Scheidt et al. | ............... | 713/166 |
| 6,538,660 B1 * | 3/2003 | Celi et al. | ............... | 345/592 |
| 6,556,994 B1 * | 4/2003 | Zheng et al. | ............... | 707/8 |
| 6,754,820 B1 * | 6/2004 | Scheidt et al. | ............... | 713/166 |
| 6,778,668 B1 * | 8/2004 | Nielsen | ............... | 380/201 |
| 7,016,495 B2 * | 3/2006 | Scheidt et al. | ............... | 380/45 |
| 7,111,173 B1 * | 9/2006 | Scheidt | ............... | 713/186 |
| 7,120,251 B1 * | 10/2006 | Kawada et al. | ............... | 380/201 |
| 7,149,900 B2 * | 12/2006 | Rothrock | ............... | 713/189 |
| 7,194,091 B2 * | 3/2007 | Higashi et al. | ............... | 380/202 |
| 7,200,747 B2 * | 4/2007 | Riedel et al. | ............... | 713/165 |
| 7,324,644 B2 * | 1/2008 | Saito | ............... | 380/200 |
| 7,391,864 B2 * | 6/2008 | Choi et al. | ............... | 380/28 |
| 7,444,632 B2 * | 10/2008 | Minor et al. | ............... | 718/100 |
| 7,509,492 B2 * | 3/2009 | Boyen et al. | ............... | 713/165 |
| 2002/0048364 A1 * | 4/2002 | Gligor et al. | ............... | 380/37 |
| 2003/0081784 A1 * | 5/2003 | Kallahalla et al. | ............ | 380/277 |
| 2003/0210790 A1 * | 11/2003 | Riedel et al. | ............... | 380/277 |
| 2003/0233328 A1 * | 12/2003 | Scott et al. | ............... | 705/50 |

OTHER PUBLICATIONS

G. Cattaneo, et al.; "The Design and Implementation of a Transparent Crytographic Filesystem for UNIX"; USENIX Annual Technical Conference 2001—Freenix Track; Jun. 29, 2001; 14 pgs.
P. Braam; "The CODA Distributed File System"; www.coda.cs.cmu.edu/ljpaper/lj.html; May 2000.

* cited by examiner

*Primary Examiner*—Farid Homayounmehr
(74) *Attorney, Agent, or Firm*—Osha • Liang LLP (57) ABSTRACT

A method for re-encrypting encrypted data in a secure storage file system, including obtaining selected data to re-encrypt from the secure storage file system using a user data access record and the encrypted data, decrypting the selected data using a symmetric key, re-encrypting the selected data using a new symmetric key to obtain new encrypted data, encrypting the new symmetric key using a public key to obtain a new encrypted symmetric key, storing the new encrypted data and the new encrypted symmetric key if the public key is associated with a file system user having read permission, and storing an encrypted hash data if the file system user has write permission.

18 Claims, 8 Drawing Sheets

METHOD AND APPARATUS FOR RE-ENCRYPTING DATA IN A TRANSACTION-BASED SECURE STORAGE SYSTEM

BACKGROUND OF INVENTION

Secure storage is becoming increasingly common as corporations move towards storing data primarily in electronic form. Unlike paper documents (i.e., "hard copies"), electronic documents are harder to secure and can be easily compromised. To address this issue, there has been an increasing interest in secure storage schemes. One such secure storage scheme that is commonly used is the Transparent Cryptographic File System (TCFS).

TCFS is a cryptographic distributed file system that is implemented on the architecture provided by the Network File System (NFS®) developed by Sun Microsystems, Inc. (NFS® is a registered trademark of Sun Microsystems, Inc., California, USA). NFS® has become commonly-used in distributed computing; NFS allows data to be accessed from a common file repository from any machine connected directly or remotely to the common file repository. Within this context, a number of security issues arise, such as unauthorized users gaining access to restricted services, etc. To prevent this from happening, the TCFS protects data at the system level.

In the TCFS scheme, data is stored in a secure server in encrypted form. When a client application requests data stored in the secure server, a request is sent to the secure server to retrieve a block of data, e.g., one or more files, corresponding to the request. The block of data is then transmitted to the client. A client kernel, running on the client, decrypts the block of encrypted data and then passes the decrypted block of data to the client application. When a request is generated by the client application to save the block of data back to the secure server, the client kernel encrypts the data and sends it back to the secure server, where the block of data is stored in encrypted form. Using this scheme, TCFS requires the client application and user to trust the client kernel that accesses the file system.

Figure 1:
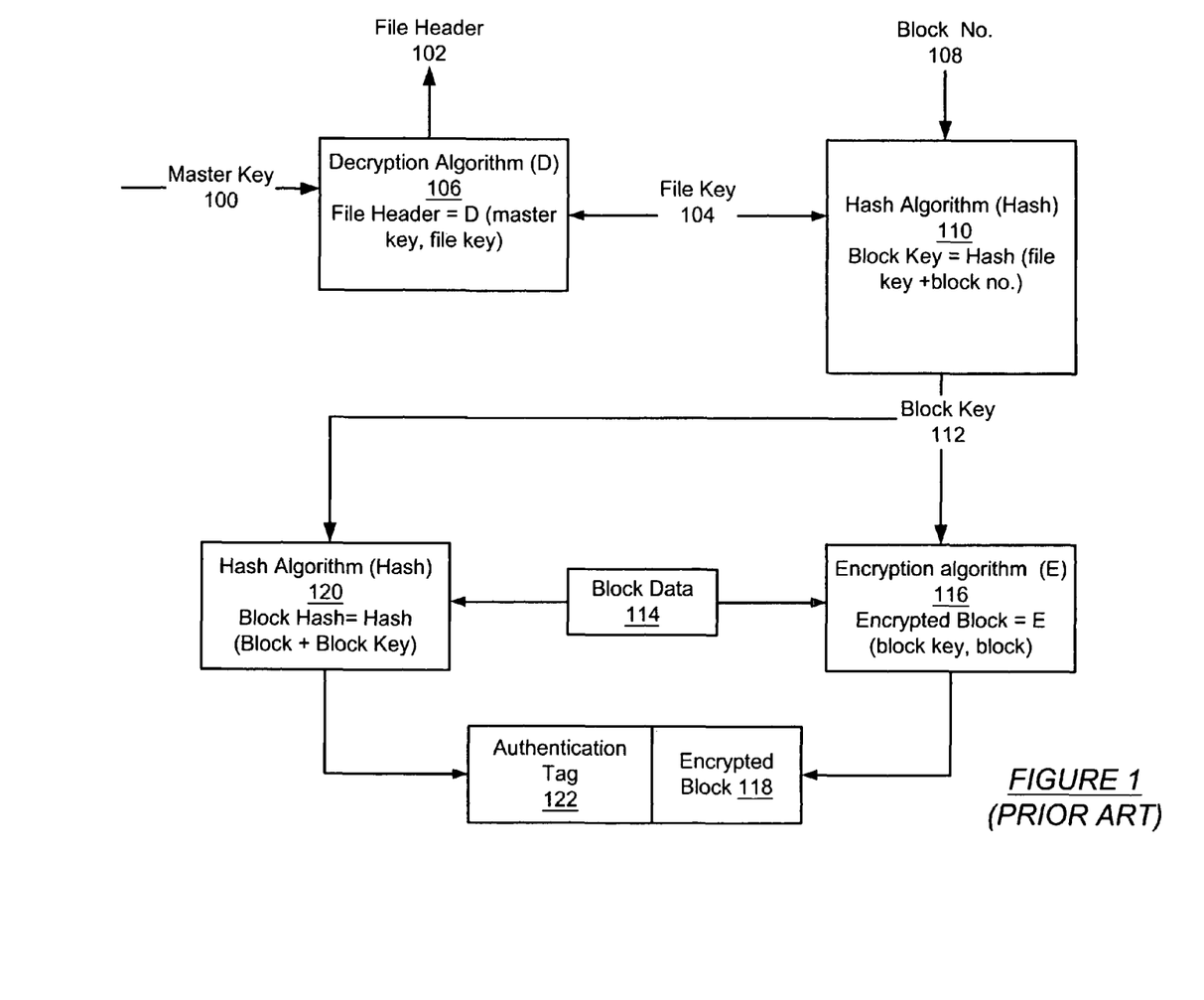
FIG. 1 illustrates a flow diagram detailing the typical method of encrypting blocks of data on a secure server using TCFS.

FIG. 1 shows a flow diagram detailing the typical method of encrypting the blocks of data on the secure server using TCFS. Initially, a master key (100) is generated for each user, and a file key (104) is generated for each file or set of files. The file key(s) (104) is/are subsequently encrypted using a decryption algorithm (D) (106) and the master key (100) with the result being stored in a file header (102). The block number (108) of the block of data is then obtained and concatenated with the file key (104). The result of the concatenation is hashed using a hashing algorithm (110) to obtain a block key (112). The block data (114) is then encrypted using the block key (112) and an encryption algorithm (E) (116) to obtain an encrypted block (118). The block data (114) concatenated with the block key (112) is also hashed using a hashing algorithm (120) to generate an authentication tag (122). To obtain the data once it has been encrypted using the scheme described in FIG. 1, a user requests a specific block number (108) and possess the file key (104) or the master key (100).

The TCFS scheme described above also includes functionality to enable threshold sharing of files among users. Threshold sharing includes specifying a minimum number of members (i.e., the "threshold") that need to be "active" for the files owned by the group to become available. TCFS enforces the threshold sharing by generating a group encryption key for each group and giving each member of the group a share using a Threshold Secret Sharing Scheme (i.e., a portion of the group encryption key). The group encryption key can be reconstructed by any set of keys as long as the number of keys in the set is at least equal to the threshold.

A member of the group that intends to become active does so by pushing his/her share of the group key into the kernel. The TCFS module checks whether the number of shares available is above the threshold. If the number of shares is above the threshold, then the TCFS module reconstructs the group encryption key. Based on the properties of the Threshold Secret Sharing Scheme, if enough shares are available, the group encryption key is guaranteed to be correctly reconstructed.

Once the group encryption key has been reconstructed, the files owned by the group become accessible. Each time a member decides to become inactive, his/her share of the group encryption key is removed. The TCFS module checks whether the number of shares available is now less than the threshold at regular intervals. In this case, the group encryption key is removed from the TCFS module triggering files owned by the group to become inaccessible.

This TCFS implementation of the group sharing facility requires each member to trust the client kernel, which hosts the TCFS module, of the machine that reconstructs the key to actually remove the group encryption key once the number of active users goes below the threshold.

SUMMARY OF INVENTION

In general, in one aspect, the invention relates to a method for re-encrypting encrypted data in a secure storage file system, comprising obtaining selected data to re-encrypt from the secure storage file system using a user data access record and the encrypted data, decrypting the selected data using a symmetric key, re-encrypting the selected data using a new symmetric key to obtain new encrypted data, encrypting the new symmetric key using a public key to obtain a new encrypted symmetric key, storing the new encrypted data and the new encrypted symmetric key if the public key is associated with a file system user having read permission, and storing an encrypted hash data if the file system user has write permission.

In general, in one aspect, the invention relates to a method for re-encrypting a plurality of layer-encrypted data blocks in a secure storage file system, comprising obtaining at least one of the plurality of layer-encrypted data blocks from the secure storage file system to re-encrypt using a user data access record and the plurality of layer-encrypted data blocks, decrypting the at least one of the plurality of layer-encrypted data blocks using a layer key, and re-encrypting the at least one of the plurality of layer-encrypted data blocks using a new layer key to obtain a new layer-encrypted data block.

In general, in one aspect, the invention relates a computer system generating a secure storage file system, comprising a processor, a memory, a storage device, a computer display, and software instructions stored in the memory for enabling the computer system under control of the processor, to perform, obtaining selected data to re-encrypt from the secure storage file system using a user data access record and the encrypted data, decrypting the selected data using a symmetric key, re-encrypting the selected data using a new symmetric key to obtain new encrypted data, encrypting the new symmetric key using a public key to obtain a new encrypted symmetric key, storing the new encrypted data and the new encrypted symmetric key if the public key is associated with a file system user having read permission, and storing an encrypted hash data if the file system user has write permission.

In general, in one aspect, the invention relates to a secure storage system comprising a storage provider storing encrypted data, wherein re-encrypting the encrypted data comprises, obtaining selected data to re-encrypt from the secure storage file system executing on the storage provider using a user data access record and the encrypted data based on receipt of a key re-encryption event, decrypting the selected data using a symmetric key, re-encrypting the selected data using a new symmetric key to obtain new encrypted data, encrypting the new symmetric key using a public key to obtain a new encrypted symmetric key, storing the new encrypted data and the new encrypted symmetric key if the public key is associated with a file system user having read permission, and storing an encrypted hash data if the file system user has write permission, and a client device, wherein the client device comprises a client kernel for generating the key re-encryption event and a client application using the encrypted data.

In general, in one aspect, the invention relates to a secure storage system comprising a storage provider storing a plurality of layer-encrypted data blocks, wherein re-encrypting layer-encrypted data blocks comprises obtaining at least one of the plurality of layer-encrypted data blocks to re-encrypt from the secure storage file system executing on the storage provider using a user data access record and the plurality of layer-encrypted data blocks based on receipt of a key re-encryption event, decrypting the at least one of the plurality of layer-encrypted data blocks using a layer key, and re-encrypting the at least of the plurality of one layer-encrypted data block using a new layer key to obtain a new layer-encrypted data block, and a client device, wherein the client device comprises a client kernel for generating the key re-encryption event and a client application using the plurality of layer-encrypted data blocks.

In general, in one aspect, the invention relates to an apparatus for re-encrypting a plurality of layer-encrypted data blocks in a secure storage file system, comprising means for obtaining at least of the plurality of one layer-encrypted data blocks to re-encrypt from a secure storage file system using a user data access record and the plurality layer-encrypted data blocks, means for decrypting the at least one of the plurality of layer-encrypted data blocks using a layer key, and means for re-encrypting the at least one of the plurality of layer-encrypted data blocks using a new layer key to obtain a new layer-encrypted data block.

In general, in one aspect, the invention relates to an apparatus for re-encrypting encrypted data in a secure storage file system, comprising means for obtaining selected data to re-encrypt from a secure storage file system using a user data access record and the encrypted data, means for decrypting the selected data using a symmetric key, means for re-encrypting the selected data using a new symmetric key to obtain new encrypted data, means for encrypting the new symmetric key using a public key to obtain a new encrypted symmetric key, means for storing the new encrypted data and the new encrypted symmetric key if the public key is associated with a file system user having read permission, and means for storing an encrypted hash data if the file system user has write permission.

Other aspects and advantages of the invention will be apparent from the following description and the appended claims.

DETAILED DESCRIPTION

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 2:
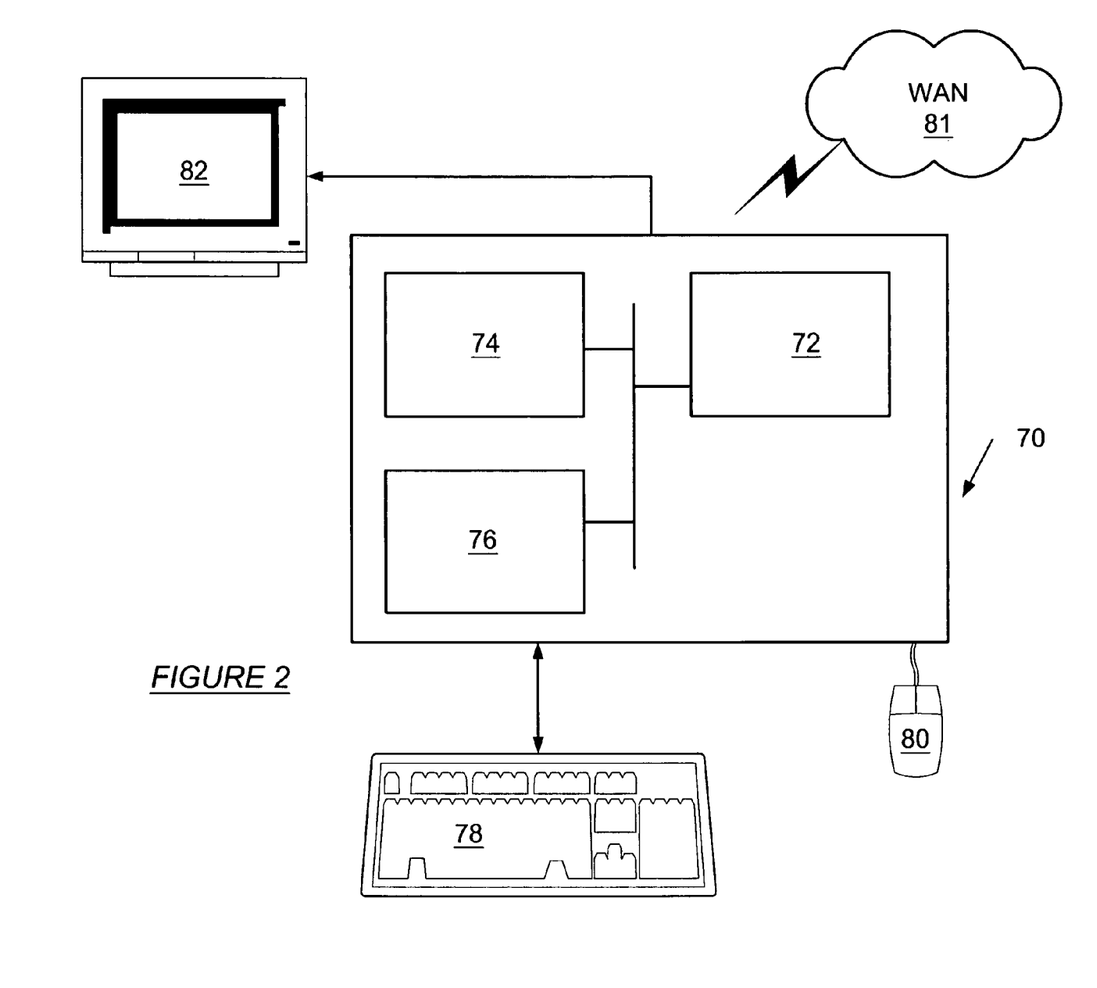
FIG. 2 illustrates a typical networked computer system.

The invention may be implemented on virtually any type of computer regardless of the platform being used. For example, as shown in FIG. 2, a typical networked computer system (70) includes a processor (72), associated memory (74), a storage device (76), and numerous other elements and functionalities typical of today's computers (not shown). The computer (70) may also include input means, such as a keyboard (78) and a mouse (80), and output means, such as a monitor (82). The networked computer system (70) is connected to a wide area network (81) (e.g., the Internet) via a network interface connection (not shown). Those skilled in the art will appreciate that these input and output means may take other forms.

Figure 3:
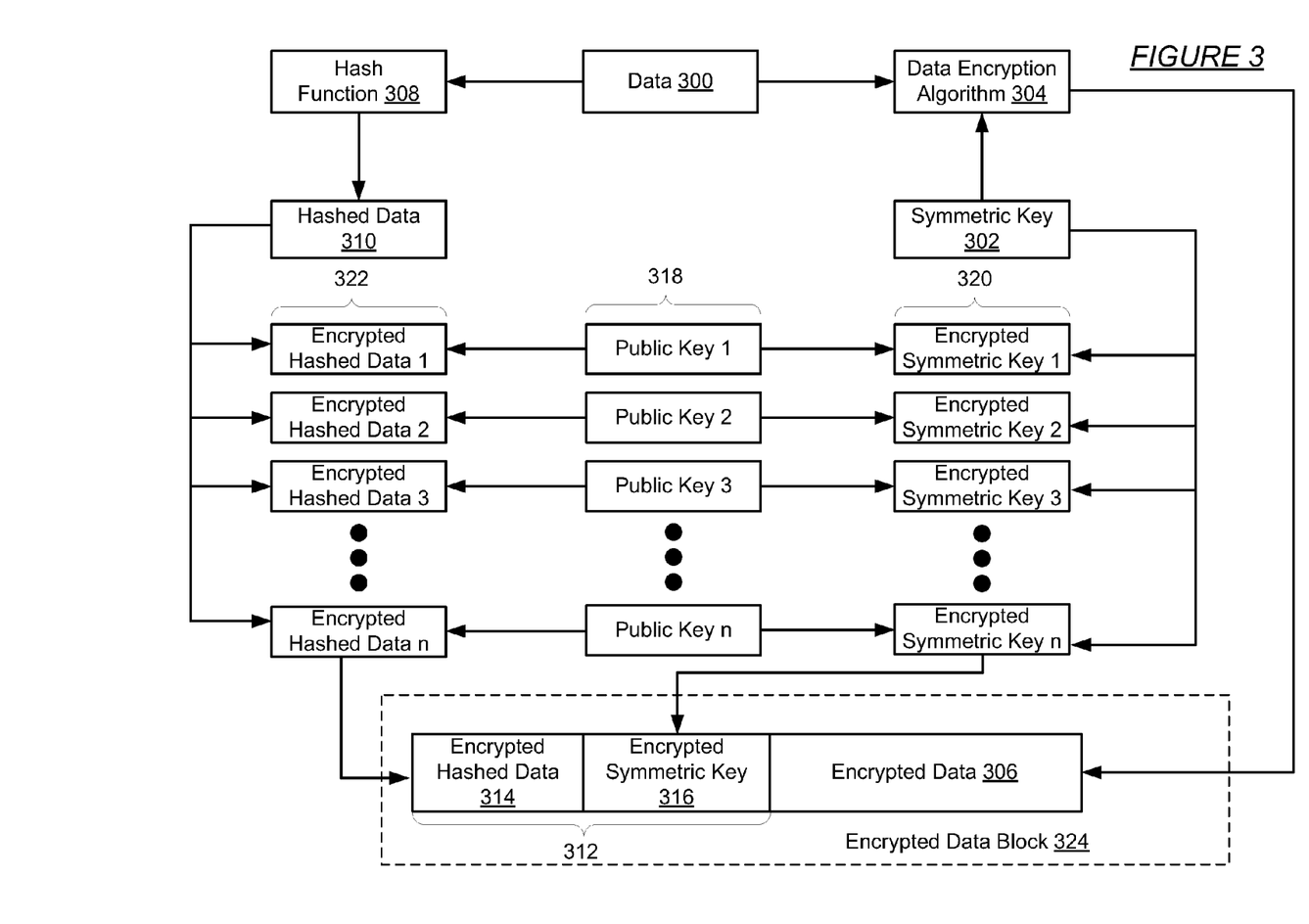
FIG. 3 illustrates a flow diagram in accordance with one embodiment of the invention.

The invention involves a secure storage system and maintenance of the secure storage system. FIG. 3 illustrates a flow diagram in accordance with one embodiment of the invention. Data (300), in the context of the invention may correspond to a single file, a portion of a file, a block range on a disk, or a file tree. To secure the data (300), a symmetric key (302) is initially generated by a client kernel (not shown) or obtained from a trusted source. The symmetric key (302) is used in conjunction with an encryption algorithm (304) to generate encrypted data (306). A hash function (308) is also applied to the data (300) to obtain hashed data (310).

The encrypted data (306) is appended to a header (312). While the header (312) shown in FIG. 3 only includes one unit of encrypted hashed data (314) and one encrypted symmetric key (316), the header (312) may contain one or more units of encrypted hashed data (314) and one or more encrypted symmetric keys (316). In accordance with one embodiment of the invention, the encrypted hashed data (314), the encrypted symmetric key (316), and the encrypted data (306) are denoted as an encrypted data block (324).

The encrypted hashed data (314) is obtained by encrypting the hashed data (310) using a private key (319), which corresponds to the public key (318) used to encrypt the symmetric keys (302). Similarly, the encrypted symmetric keys (316) are obtained by encrypting the symmetric key (302) with the public keys (318). The corresponding private keys (319) may be held by various users or stored in encrypted format by one or more key servers for another layer of indirection. Users (or processes on their behalf) access the keys directly, or over the key server, to obtain the actual data.

The various encrypted symmetric keys (320) and encrypted hash data (322) allows the data (300) to be accessed by various people having various access rights. For example, a read permission may correspond to having access to the decryption keys for the data, but not having the ability to sign the hash (i.e., generate the encrypted hashed data (314)). Thus, a user with a read permission has a private key that corresponds with a public key used to encrypt an encrypted symmetric key (320), but does not have a corresponding encrypted hashed data (e.g., an encrypted hashed data encrypted using the user's private key) associated with the encrypted data. Thus, when a user without write permission attempts to write to a file, the system is not able to verify any encrypted hash data that the user generates because there is no encrypted hash data associated with the encrypted data corresponding to the user.

In accordance with an embodiment of the invention, the header contains both an encrypted symmetric key and an encrypted hashed data, which corresponds to the private key held by the user or a group. Thus, in accordance with one embodiment of the invention, if there are 100 users/groups with write permission for the encrypted data (306), there may be 100 instances of the encrypted hashed data (314) included as part of the encrypted data block (324). Likewise, if there are 200 users/groups with read permission to the encrypted data (306), there are 200 instances of the encrypted symmetric key (316) included as part of the encrypted data block (324).

Alternatively, all the encrypted data (306) may be signed by one instance of hash data (310) (as opposed to having a one-to-one relationship of users to hash data (310) as discussed in the previous embodiment). If only one hash data (310) is used for all the encrypted data (306), then only one encrypted hash data (316) is included in the encrypted data block (324), where the encrypted hash data (316) corresponds to the last user who wrote to the data (300). Note that the implementation of the aforementioned embodiment may be extended such that there are a few instances of encrypted hash data (316) for all the data (300) (e.g., a one-to-many relationship), as opposed to having only one encrypted hash data (316) for the all the data (300).

Those skilled in the art will appreciate that in addition to read only and read/write permissions, a user/group may also have write only permissions. The write only permission may be implemented such that a user with write permission has the ability to add text to the document (e.g., using an append function), encrypt the text using the required symmetric key, and then sign the text that was added. Once this processes is complete, the document and the appended portion are encrypted using a public key to obtain encrypted data (e.g., 306). At this point the user who has write only access cannot view the encrypted data because they do not have the private key necessary to decrypt the encrypted data and view the entire document.

Additionally, there may be different write level permissions. For example, the write level permissions may be subdivided into different sub-levels, such as insert, append, truncate, delete, etc. In one embodiment of the invention, a transaction-based or journaling file system is used to enforce the access control for the various sub-levels of the write permission. Further, the access control used in conjunction with the transaction-based file systems can be performed by either a client kernel directly, or by "reconciliation servers" on their behalf. With respect to journaling file systems, access control is typically enforced by the reading of data of the journaling file systems by users of the file system.

In one embodiment of the invention, a number of users may have access to one private key and, accordingly, all have the same access permission. If the members in the group change, a new public/private key pair may be generated and used to re-encrypt the file, the portion of the file, file-tree, etc.

Figure 4:
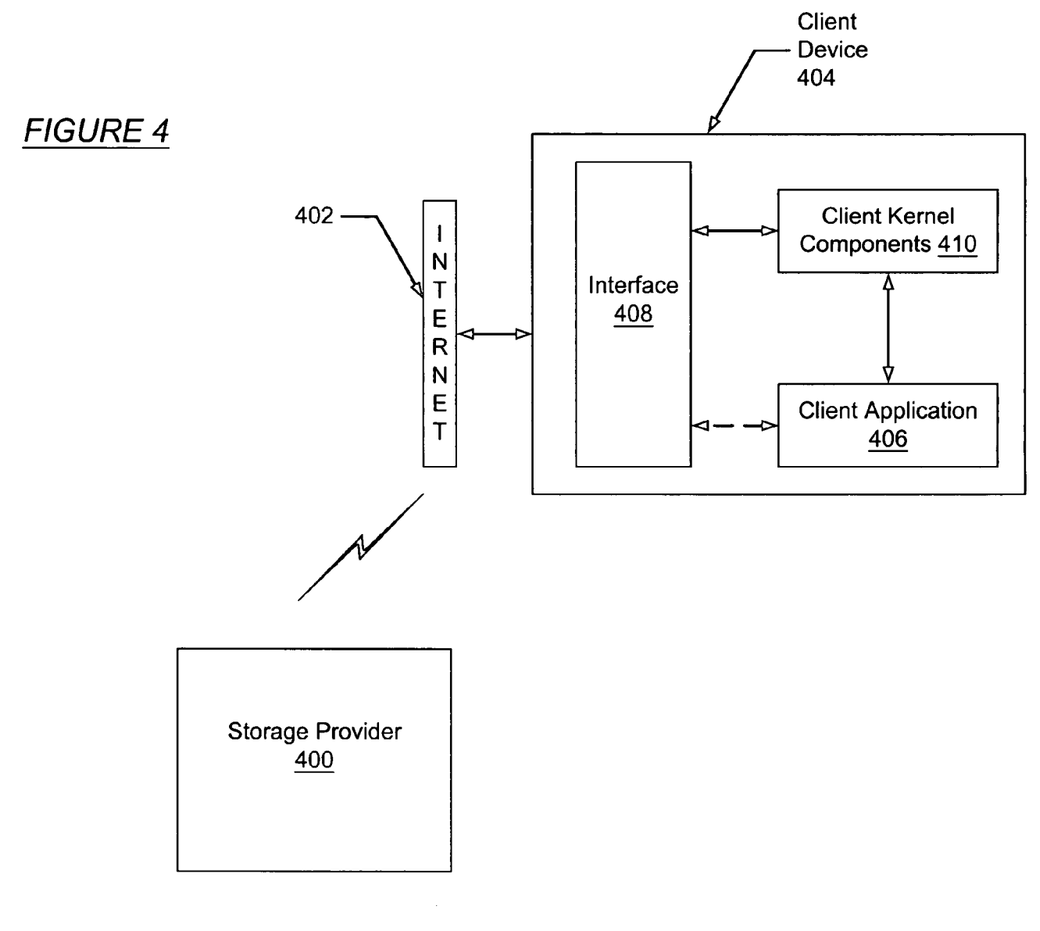
FIG. 4 illustrates a secure storage system in accordance with one embodiment of the invention.

FIG. 4 illustrates a secure storage system in accordance with one embodiment of the invention. The secure storage system includes several components that may interact with each other. The secure storage system includes a storage provider (400), a communications infrastructure (402) (e.g., the Internet), and a client device (404). The storage provider (400) may be any device that can store data under a given name, and later return the data to any device that requests the data. Examples of the storage provider (400) include a database server, an NFS® file system, local disk space, a data storage provider offering its services over the Internet such as web hosting space, etc. In some cases, there may be multiple storage providers, where storage operations are redundantly issued to several of them, as the reliability and availability of particular storage provided is not assumed.

The storage provider (400) is typically connected via a communications infrastructure (402), such as the Internet, to the client device (404). The transfer of data from the storage provider (400) to the client device (404) may be secured using Internet Protocol Security (IPSec), Secure Socket Layer (SSL), Supernets, etc., to provide end-to-end or groupwise security (i.e., authentication and confidentiality) communication. The client device (404) typically includes a number of sub-components. In particular, the client device (404) may include user-centric client applications (406) (i.e., login/logout functionality, access control management, etc.). Additionally, the client device usually includes an application interface (408) for client applications (i.e., 406 in FIG. 4) that are aware of secure storage schemes, such as the one shown in FIG. 3. Additionally, the client device (404) includes kernel components (410) that perform the bulk-encryption, on a high level, in the file system.

In one embodiment of the invention, the client device may include a pre-loaded shared library that can translate read/write/file name accesses into different read/write/file name accesses (without modifying the structure of the file system, and thus exposing the file system hierarchy). Alternatively, the shared library may also map read/write/file name accesses to a custom-implemented file system. The mapping may take place in the library itself, or in a process with which the library communicates (e.g., via shared memory (SHM)) and which acts on behalf of the library. The custom file system may reside on top of the existing file system and be realized as a set of opaque files, or alternatively, the file system may include access to a raw block device (e.g., a floppy disk, tape drive, etc.).

In one embodiment of the invention, the request for files between a pre-existing file system and the client kernel (410) may be intercepted at the Virtual File System level, as a separate, file system implementation, or by modifying an existing file system implementation.

Depending on the trust model used, the implementation of the invention may vary. In one embodiment, the secure storage device, such as a data server, is only trusted for storing data and, accordingly, a transaction-based approach may be necessary. The integrity of the data may be guaranteed using the same key that is used for encryption of the data to also generate a message authentication code (MAC). The MAC is generated by calculating a cryptographically secure checksum on the block of data, and this checksum is secured by a symmetric or asymmetric key. Thus, only possessors of the encryption key (symmetric or asymmetric key) are able to prove to others that the data is valid. If a third-party tampers with the data, but does not have the encryption key, the third-party cannot generate a MAC that matches the modified data block.

Accordingly, every transaction (i.e., change in the file system) caused by a user is authenticated, and then is stored as such. Users retrieving later versions of amended documents on the file system receive all those transactions and are required to verify that each transaction was valid. Periodically, a user may merge all the transactions in one new file system view.

In one embodiment of the invention, the secure storage is trusted to reliably identify a user (i.e., guarantee his/her authenticity) and, accordingly, transaction-based file systems may be easily used. In particular, symmetric cryptography may be used for the actual authentication of the transaction.

In one embodiment of the invention, the secure storage is trusted to perform access control, and then the transaction-based file system may not be required, as each user can trust the view as presented by the server. Also, re-encryption of data is a less immediate need because the server can deny read access to non-authenticated users.

Figure 5:
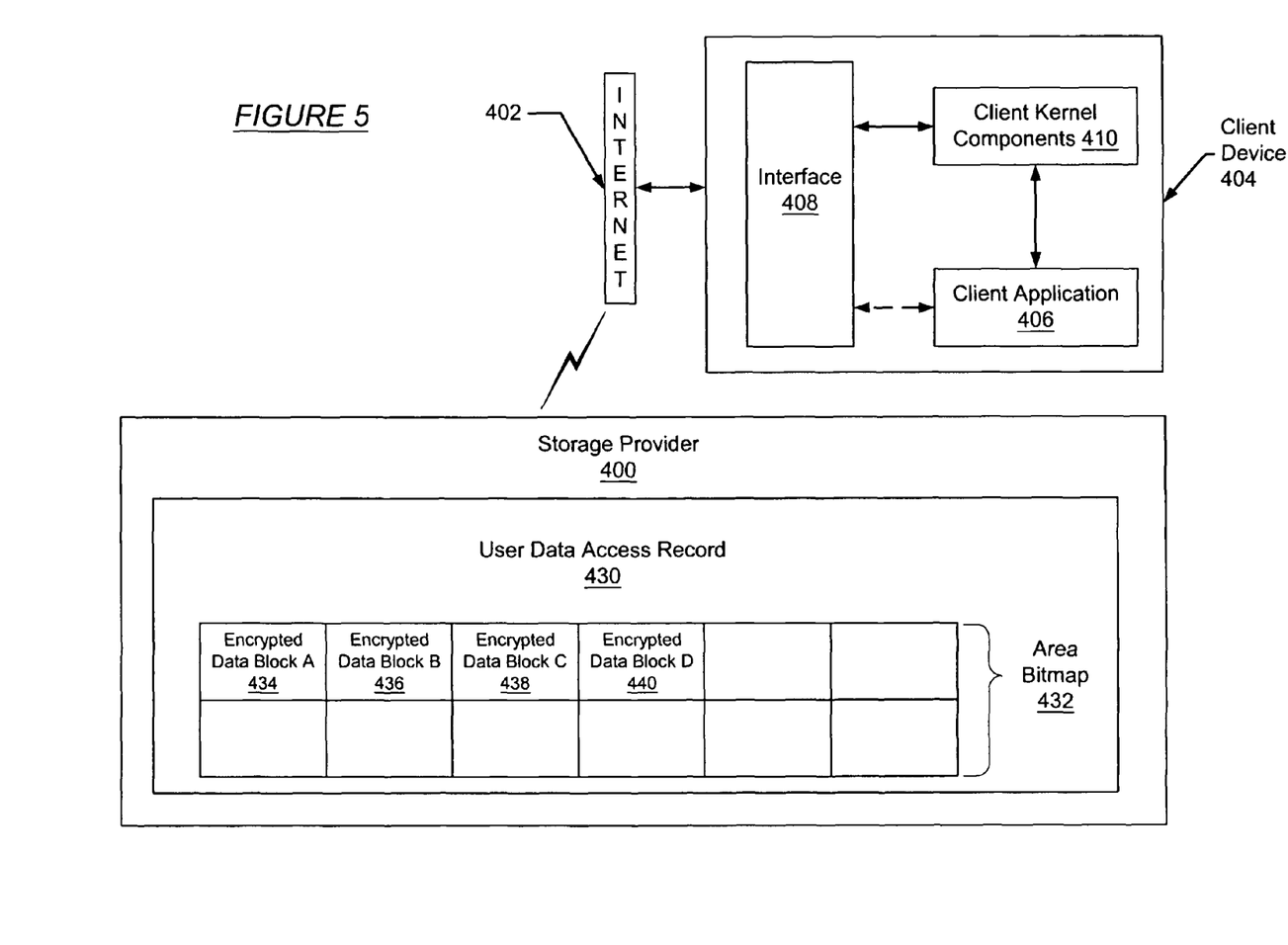
FIG. 5 illustrates a secure storage system with a client data access record in accordance with one embodiment of the invention.

FIG. 5 illustrates an embodiment of the secure storage system shown in FIG. 4, where the storage provider (400) includes one or more instances of a user data access record (430). The user data access record (430), in accordance with one embodiment of the invention, includes one or more area bitmaps (432), indicating which encrypted data (306 in FIG. 3) within the encrypted data blocks (324 in FIG. 3), stored in the storage provider (400), have been accessed by a particular user. For example, at any particular time, a particular user (via a client device (404)) may have accessed all, or some subset of encrypted data (306 in FIG. 3) stored in the storage provider (400). Thus, in this example, the user data access record (430) may indicate that only encrypted data blocks A-D (434-440) have been accessed by the user. In accordance with one embodiment of the invention, each user may have his/her own user data access record (430). Alternative, one global user access record may be used to track access for all the users, or a user access record may be set up to track access for a particular group of individuals.

Figure 6:
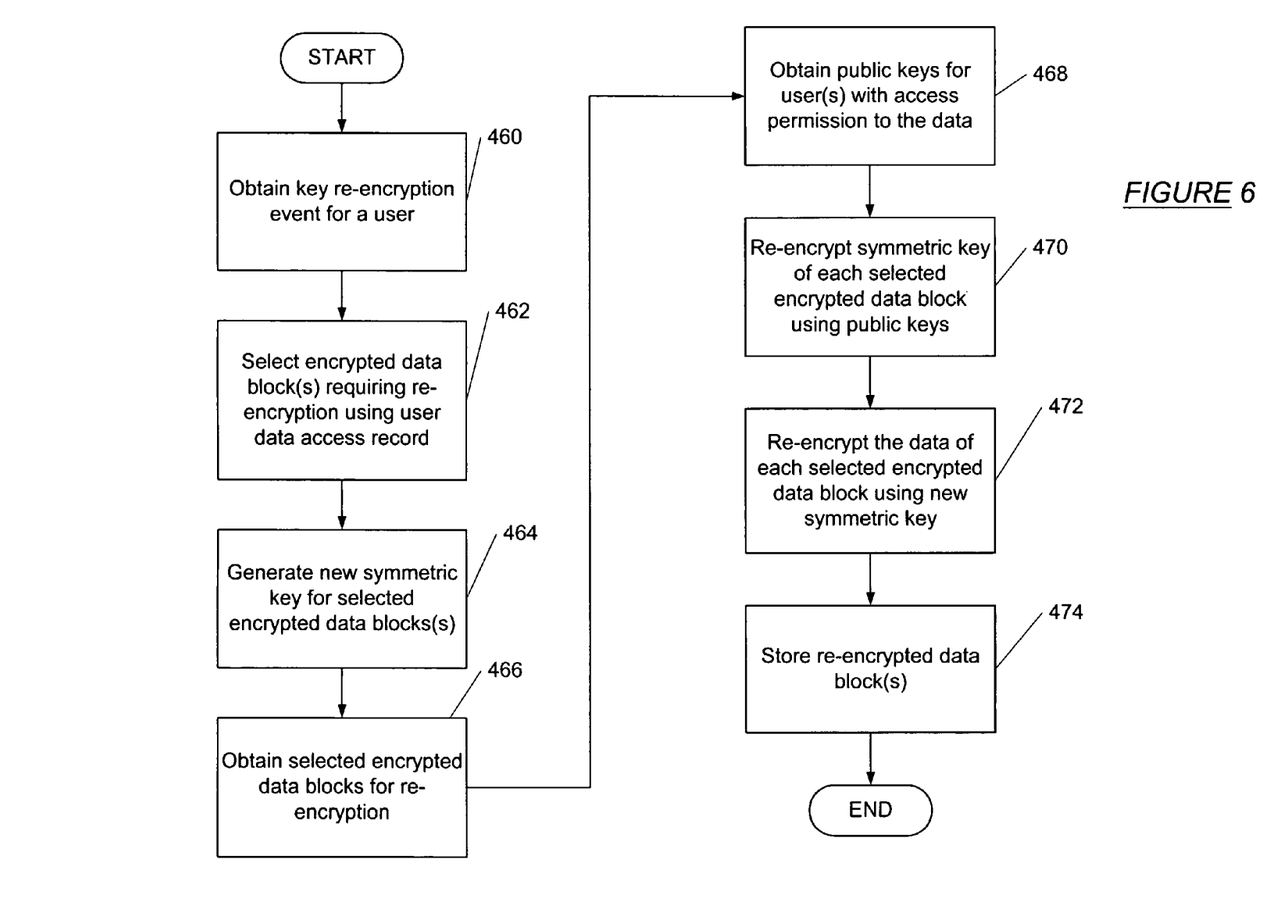
FIG. 6 illustrates a flowchart for maintaining a secure storage system with encrypted data blocks in accordance with one embodiment of the invention.

FIG. 6 illustrates a flowchart for maintaining the secure storage system using an encrypted data block in accordance with one embodiment of the invention. Initially, a key re-encryption event for one or more users is obtained (Step 460). For example, if a user is an employee of an company, and the user quits or is terminated, a key re-encryption event may be triggered and subsequently obtained by the secure storage file system or an agent acting on behalf of the secure storage file system. Alternatively, the key re-encryption event may be triggered periodically, e.g., by a "cron" script, or other administrative software tools.

The user data access record (430 in FIG. 5) is then used to select the encrypted data block(s) that the user or group of users has previously accessed (Step 462). A new symmetric key for re-encryption is subsequently generated (Step 464). The selected encrypted data block(s) are then obtained from the secure storage provider (Step 466). During this step, the encrypted data is decrypted and processed/formatted, as necessary, to prime the data for re-encryption using the new symmetric key.

In one embodiment of the invention, the encrypted data block may be divided into its requisite portions (i.e., encrypted hash data, encrypted symmetric key(s), and encrypted data) on the secure server such that only the encrypted data is sent across the network for re-encryption. In this case, the encrypted symmetric key and the encrypted hash data may remain on the server, thus reducing the amount of information that is required for re-encryption. This scenario assumes there is a means for the process of performing the re-encryption to obtain the symmetric key to decrypt the encrypted data prior to encrypting the data with a new symmetric key.

Returning to FIG. 6, the public keys associated with users that have access permission (read, write, etc.) for the data are obtained (Step 468). These public keys may be obtained by first generating a list of users who have access permission from a central database, the secure storage provider, or from any other trusted source, and then retrieving the public keys from the same source that generated the list, or from a different source. Once the public keys of users have been obtained, the new symmetric key is encrypted using each of the public keys (Step 470). For example, if there are 200 users with read permission for the data for a particular encrypted data block, the new symmetric key is re-encrypted with each public key (i.e., re-encrypted 200 times). Note that because the hash data is typically obtained by hashing the decrypted data, re-computation of the hash functions during the re-keying process is usually unnecessary.

The data of the encrypted data block is then encrypted using the new symmetric key (Step 472). Completion of steps 470-472 provides a re-encrypted data block. The re-encrypted data block includes the re-encrypted data and one or more encrypted new symmetric keys, and additionally may include one or more previously encrypted hashed data. Once the encrypted data block(s) have been re-encrypted, the encrypted data block(s) are stored (Step 474). In accordance with one embodiment of the invention, encrypted data block(s) are sent over the network connection to a storage provider for storage.

Steps 464-474 may be performed for each encrypted data block. Further, in the case where there are different users with different access permissions for each encrypted data block, steps 464 and 468-470 may be performed for each encrypted data block.

The flowchart of FIG. 6 illustrates a method for the re-encryption of the encrypted data block(s) including re-encryption of a new symmetric key with each public key of clients with access permission. However, as illustrated in FIG. 7, a layer key may be used to re-encrypt the encrypted data block(s) without necessitating re-encryption of the new symmetric key with each public key, and re-encryption of the data with the new symmetric key.

Figure 7:
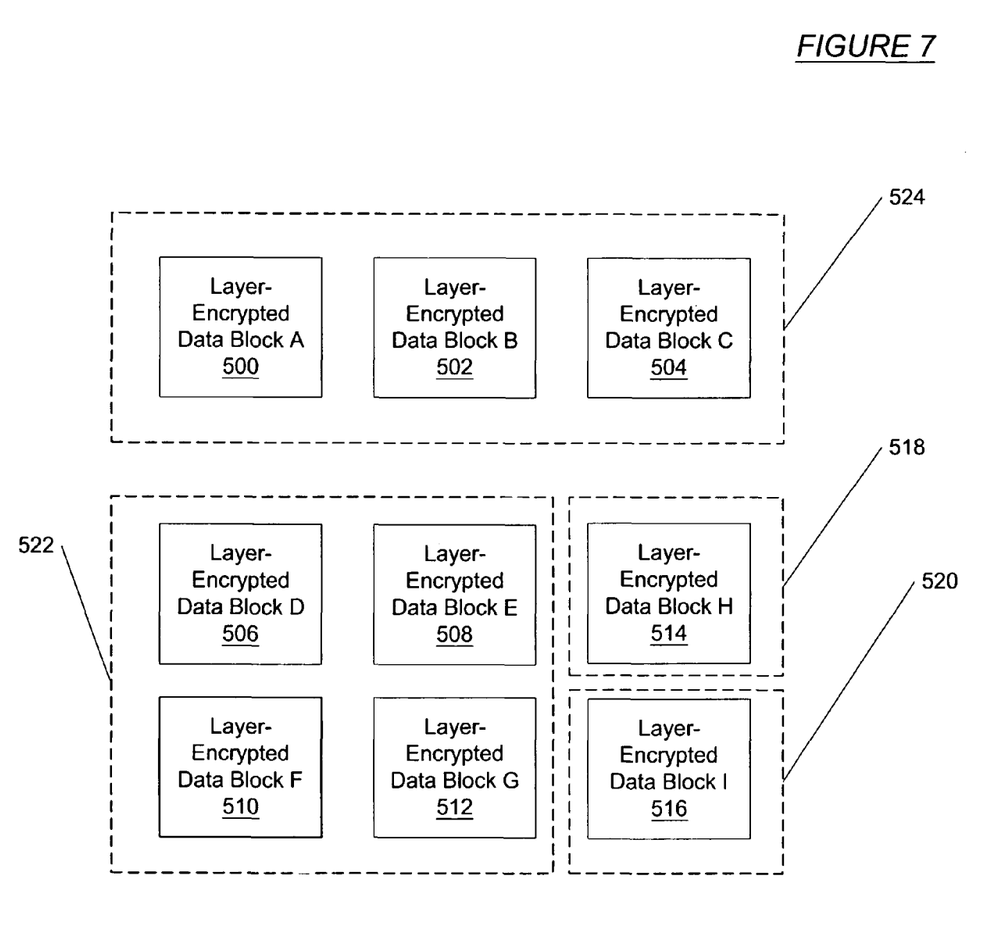
FIG. 7 illustrates a plurality of layer-encrypted data blocks in accordance with one embodiment of the invention.

FIG. 7 illustrates a plurality of layer-encrypted data blocks in accordance with one embodiment of the invention. As illustrated in FIG. 7, an encrypted data block or group of encrypted data blocks encrypted with a layer key is a layer-encrypted data block. For example, layer-encrypted data blocks A-C (500-504) are encrypted with layer key (524) and layer-encrypted data blocks D-G (506-512) are encrypted with layer key (522). Layer-encrypted data block H (514) is encrypted with layer key (518), and layer-encrypted data block I (516) is encrypted with layer key (520). For the user to obtain access to the data, which is encrypted using both the symmetric key and the layer key, the user is typically authenticated by an authentication agent or process. The authentication agent or process will subsequently provide the user with the necessary information to decrypt the layer-encrypted data block.

Figure 8:
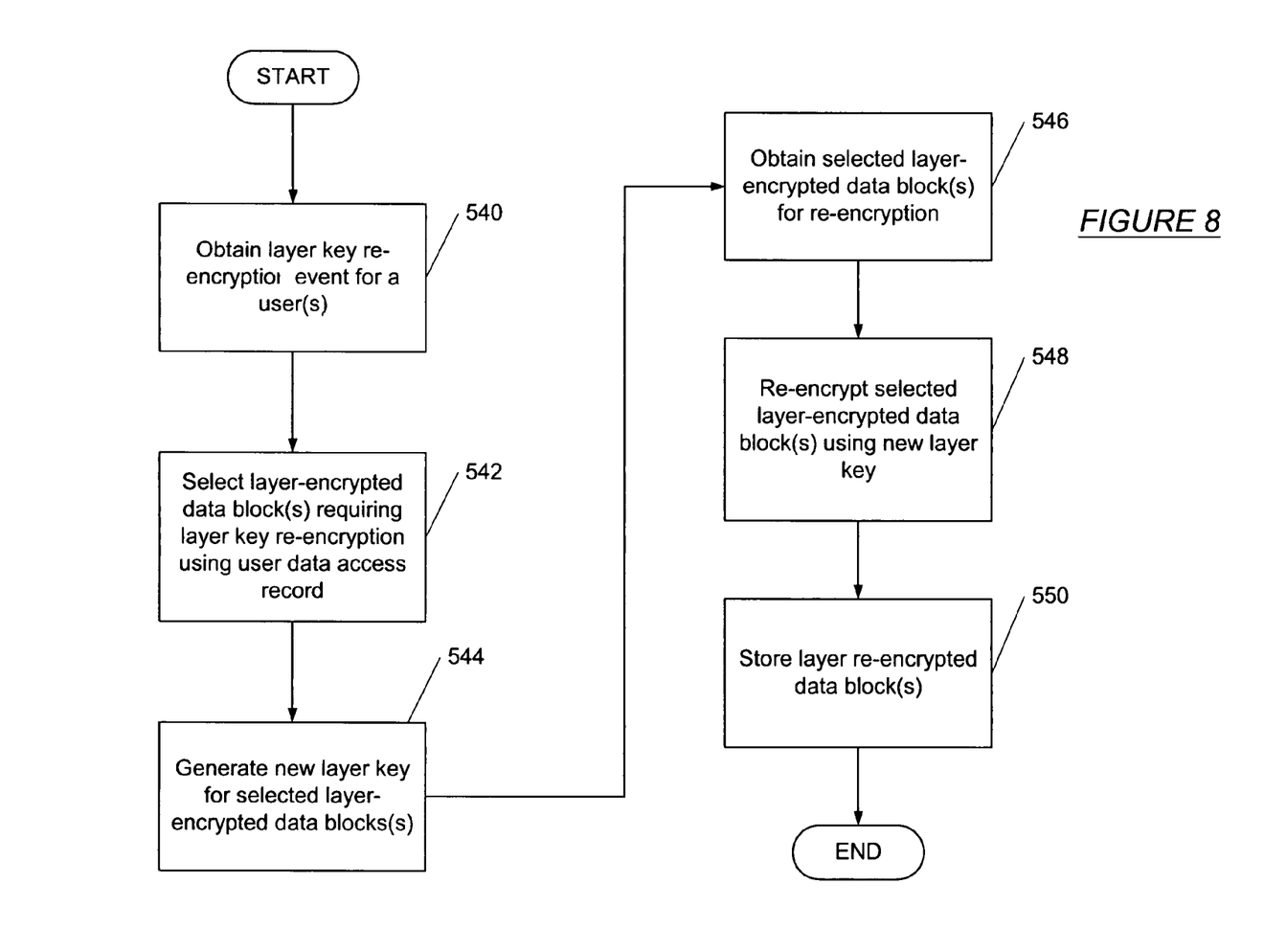
FIG. 8 illustrates a flowchart for maintaining a secure storage system with layer-encrypted data blocks in accordance with one embodiment of the invention.

FIG. 8 illustrates a flowchart for maintaining the secure storage system using one or more layer-encrypted data blocks in accordance with one embodiment of the invention. Initially, a layer key re-encryption event for one or more users is obtained (Step 540). The user data access record is then used to select the layer-encrypted data block(s) that the user or group of users has/have accessed (Step 542). A new layer key is generated for the selected layer-encrypted data blocks (Step 544). The generation of a new layer key may include generating a new symmetric key for all the layer-encrypted data blocks or generation of a layer key for each of the selected layer-key encryption blocks.

The selected layer-encrypted data block(s) is obtained for re-encryption (Step 546). During this step, the layer-encrypted data blocks are retrieved from the secure server and decrypted to produce encrypted data blocks that subsequently may be re-encrypted using the layer keys. In accordance with an embodiment of the invention, the selected layer-encrypted data block(s) is obtained from the storage provider and is sent over a network connection for re-encryption at a location remote from the storage provider.

The layer-encrypted data block(s) is re-encrypted using the new layer key (Step 548), thus providing a layer-re-encrypted data block. Once the layer-encrypted data block(s) has been re-encrypted, the layer-re-encrypted data block(s) is stored (Step 550). In accordance with one embodiment of the invention, the layer-re-encrypted data block(s) are sent over the network connection to the storage provider for storage.

As an alternative to transferring encrypted data from the storage provider, over the network, to the system performing the re-keying and then subsequently returning the data over the network, the secure storage file system may be implemented using a secure processor, such as the one disclosed in pending U.S. application Ser. No. 10/046,398. The secure processor may be used to provide the re-encryption keys necessary for the encryption.

Alternatively, the secure storage file system may be implemented such that the when a re-keying is necessary (or required), the user provides an additional encryption key to encrypt the already encrypted data in the secure file system. Thus, multiple keys are required for the users/groups to access the newly encrypted data. After a certain threshold of de-encryption keys is met (for example, three de-encryption keys are required to access the encrypted data), the secure storage file system may be "cleaned," such that only one encryption key is required. To clean the secure file system, all the encrypted data is typically sent over the network to a secure location, such as the client device (404 in FIG. 4). The data is subsequently decrypted and then re-encrypted with only one encryption key. The clean version of the encrypted data is then sent back to the storage provider (i.e., 400 in FIG. 4).

In accordance with an embodiment of the invention, new layers keys may be distributed over the network connection (or via other means) to users and client devices. Thus, authenticated users may decrypt the layer-encrypted data blocks to access the data.

Those skilled in the art will appreciate that the flowcharts presented in FIGS. 6 and 8 may differ according to implementation, especially with respect to sequential order of the steps. For example, steps 462 and 464 of FIG. 6 may be performed in reverse order.

Those skilled in the art will appreciate that the data encryption methods described in the invention may be implemented on the storage provider, on the client device, or on a proxy situated between the storage provider and the client device.

As an alternative to re-encrypting the data as soon as a change occurs in the users/groups that may access a certain piece of data (e.g., a particular document), the present invention may be implemented such that re-keying only occurs when the certain piece of data has been modified. Thus, the re-keying may occur once a write operation is performed on a document, such that the new modified document is re-encrypted using a new encryption key.

Alternatively, documents may be re-keyed by determining which documents, over a specified period of time (e.g., a one-day period), indicate a change has occurred to the users/groups that may access the document. All the documents in which the users/groups have changed are then re-keyed together. This scheme allows for saving on duplicated efforts that may occur when performing re-keying individually.

Further, in a general effort to maintain a high level of security, all the documents may be re-keyed periodically, e.g., every week, every month, etc.

Embodiments of the invention may have one or more of the following advantages. The invention provides for efficient key re-encryption by limiting the amount of data that is required to be re-encrypted. The amount of data to be re-encrypted is limited using user data access records. Further, the invention provides for efficient key re-encryption by using a layer key architecture in the secure storage file system. Also, the invention provides functionality to use the layer key architecture in conjunction with the user data access record to limit the amount of data that is required to be re-encrypted.

In addition, the invention provides access control (distinct read/write/append/truncate/delete) to files through cryptographic mechanisms that may be applied to large groups. Further, the invention provides kernel data access extensions and kernel file name access extensions for the cryptography. Moreover, the invention provides secure data storage without requiring a user to trust a storage provider or the intermediate communication infrastructure. Additionally, the invention allows data to be securely stored regardless of where the secure storage is located, e.g., the storage provider may be the local disk of a client or a remote client. Thus, the data is protected using a location-independent manner. Further, the invention provides a secure storage scheme that is transparent to client applications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for re-encrypting encrypted data in a secure storage file system, comprising:

obtaining one or more selected encrypted data blocks from the secure storage file system, each selected encrypted data block comprising a selected encrypted data, the one or more selected encrypted data blocks comprising data blocks accessed by a first user, wherein the one or more selected encrypted data blocks were selected based on a user data access record, wherein the user data access record comprises a bitmap indicating which encrypted data blocks are accessed by a first user;

decrypting, re-encrypting and storing each one of the one or more selected encrypted data blocks, the decrypting, re-encrypting and storing of each data block comprising:

decrypting the selected encrypted data using a first symmetric key associated with the encrypted data block to obtain selected data;

re-encrypting the selected data using a second symmetric key associated with the data block to obtain new encrypted data;

for each user who has access to the data block, obtaining a public key associated with a private key, wherein the first user is denied access to the private key;

encrypting the second symmetric key using the public key to obtain a new encrypted symmetric key;

storing in a new data block, stored in a storage device;

the new encrypted data and the new encrypted symmetric key if a second user has read permission, wherein the second user is allowed access to the private key;

applying a hash function to the selected data to obtain hash data;

encrypting the hash data with the private key to obtain encrypted hash data; and         storing the encrypted hash data, the new encrypted data, and the new encrypted symmetric key if the second user has write permission.

2. The method of claim 1, wherein the user data access record comprises at least one selected from the group consisting of a bitmap for each user and a bitmap for each group of users.

3. The method of claim 1, wherein the write permission comprises at least one sub-division.

4. The method of claim 3, wherein the sub-division is selected from a group consisting of insert, append, truncate, and delete.

5. The method of claim 1, wherein the secure storage file system is implemented using a preloaded shared library.

6. The method of claim 5, wherein the preloaded shared library translates read/write/file name accesses into different read/write/file name accesses.

7. The method of claim 1, wherein the secure storage file system is implemented using a shared library that includes functionality to map read/write/file name accesses to a custom-implemented file system.

8. A computer system generating a secure storage file system, comprising:

a processor;

a memory;

a storage device;

a computer display; and software instructions stored in the memory for enabling the computer system under control of the processor, to perform:

obtaining one or more selected encrypted data blocks from the secure storage file system, each selected encrypted data block comprising a selected encrypted data, the one or more selected encrypted data blocks comprising data blocks accessed by a first user, wherein the one or more selected encrypted data blocks were selected based on a user data access record, wherein the user data access record comprises a bitmap indicating which encrypted data blocks are accessed by a first user;

decrypting, re-encrypting and storing each one of the one or more selected encrypted data blocks, the decrypting, re-encrypting and storing of each data block comprising:

decrypting the selected encrypted data using a first symmetric key associated with the data block to obtain selected data;

re-encrypting the selected data using a second symmetric key associated with the data block to obtain new encrypted data;

for each user who has access to the data block, obtaining a public key associated with a private key, wherein the first user is denied access to the private key;

encrypting the second symmetric key using the public key to obtain a new encrypted symmetric key;

storing in a new data block, stored in a storage device the new encrypted data and the new encrypted symmetric key if a second user has read permission, wherein the second user is allowed access to the private key;

applying a hash function to the selected data to obtain hash data;

encrypting the hash data with the public key to obtain encrypted hash data; and     storing the encrypted hash data, the new encrypted data, and the new encrypted symmetric key if the second user has write permission.

9. The computer system of claim 8, wherein the write permission comprises at least one sub-division.

10. The computer system of claim 9, wherein the sub-division is selected from a group consisting of insert, append, truncate, and delete.

11. The computer system of claim 8, wherein the secure storage file system is implemented using a preloaded shared library.

12. The computer system of claim 11, wherein the preloaded shared library translates read/write/file name accesses into different read/write/file name accesses.

13. The computer system of claim 8, wherein the secure storage file system is implemented using a shared library that includes functionality to map read/write/file name accesses to a custom-implemented file system.

14. The computer system of claim 8, wherein the user data access record comprises at least one selected from the group consisting of a bitmap for each user and a bitmap for each group of users.

15. A secure storage system comprising:

a storage provider storing encrypted data in a storage device,     obtaining one or more selected encrypted data blocks from the secure storage file system, each selected encrypted data block comprising a selected encrypted data, the secure storage file system executing on the storage provider using a user data access record in response to receiving a key re-encryption event,     the one or more selected encrypted data blocks comprising data blocks accessed by a first user, wherein the one or more selected encrypted data blocks were selected based on a user data access record, wherein the user data access record comprises a bitmap indicating which encrypted data blocks are accessed by a first user;

decrypting, re-encrypting and storing each one of the one or more selected encrypted data blocks, the decrypting, re-encrypting and storing of each data block comprising:

decrypting the selected encrypted data using a first symmetric key associated with the encrypted data block to obtain selected data;

re-encrypting the selected data using a second symmetric key associated with the data block to obtain new encrypted data;

for each user who has access to the data block, obtaining a public key associated with a private key, wherein the first user is denied access to the private key;

encrypting the second symmetric key using the public key to obtain a new encrypted symmetric key;

storing in a new data block, stored in the storage device, the new encrypted data and the new encrypted symmetric key if a second user has read permission, wherein the second user is allowed access to the private key;

applying a hash function to the selected data to obtain hash data;

encrypting the hash data with the private key to obtain encrypted hash data; and storing the encrypted hash data, the new encrypted data, and the new encrypted symmetric key if the second user has write permission; and a client device, wherein the client device comprises a client kernel for generating the key re-encryption event and a client application using the encrypted data.

16. The system of claim 15, wherein the user data access record comprises at least one selected from the group consisting of a bitmap for each user and a bitmap for each group of users.

17. The system of claim 15, wherein the write permission comprises at least one sub-division.

18. The system of claim 17, wherein the sub-division is selected from a group consisting of append, truncate, and delete.

* * * * *